US010087081B2

(12) United States Patent
Wong Shing et al.

(10) Patent No.: US 10,087,081 B2
(45) Date of Patent: Oct. 2, 2018

(54) PROCESS FOR PRODUCING HIGH SOLIDS COLLOIDAL SILICA

(71) Applicant: Ecolab USA Inc., St. Paul, MN (US)

(72) Inventors: Jane B. Wong Shing, Aurora, IL (US); Zhi Chen, Shanghai (CN); Dennis MacDonald, Wheaton, IL (US); Ronald S. Doles, LaGrange Park, IL (US); Wen Bai, Shanghai (CN); Raymond D. Miller, Jr., Carol Stream, IL (US)

(73) Assignee: ECOLAB USA INC., Naperville, IL (US)

( * ) Notice: Subject to any disclaimer, the term of this patent is extended or adjusted under 35 U.S.C. 154(b) by 251 days.

(21) Appl. No.: 13/791,627

(22) Filed: Mar. 8, 2013

(65) Prior Publication Data
US 2014/0251565 A1 Sep. 11, 2014

(51) Int. Cl.
D21H 17/68 (2006.01)
D21H 21/10 (2006.01)
C01B 33/148 (2006.01)

(52) U.S. Cl.
CPC .......... C01B 33/148 (2013.01); D21H 17/68 (2013.01); D21H 21/10 (2013.01); C01P 2006/12 (2013.01)

(58) Field of Classification Search
None
See application file for complete search history.

(56) References Cited

U.S. PATENT DOCUMENTS

| | | | |
|---|---|---|---|
| 2,631,134 A | 3/1953 | Iler et al. | |
| 2,731,326 A | 1/1956 | Alexander et al. | |
| 2,750,345 A | 6/1956 | Alexander | |
| 2,913,419 A | 11/1959 | Alexander | |
| 3,969,266 A | 7/1976 | Iler | |
| 4,217,240 A | 8/1980 | Bergna | |
| 4,343,717 A * | 8/1982 | Lok | C01B 33/142 106/287.34 |
| 4,385,961 A | 5/1983 | Svending et al. | |
| 4,388,150 A | 6/1983 | Sunden et al. | |
| 4,753,710 A | 6/1988 | Langley et al. | |
| 4,913,775 A | 4/1990 | Langley et al. | |
| 4,927,498 A | 5/1990 | Rushmere | |
| 4,988,659 A | 1/1991 | Pecoraro | |
| 5,098,520 A | 3/1992 | Begala et al. | |
| 5,182,062 A | 1/1993 | Regelsberger et al. | |
| 5,196,177 A | 3/1993 | Watanabe et al. | |
| 5,221,648 A | 6/1993 | Wachter | |
| 5,368,833 A | 11/1994 | Johansson et al. | |
| 5,447,604 A | 9/1995 | Johansson et al. | |
| 5,573,674 A * | 11/1996 | Lind | C02F 1/52 106/287.34 |
| 5,603,805 A | 2/1997 | Andersson et al. | |
| 5,688,482 A | 11/1997 | Saastamoinen | |
| 5,840,158 A | 11/1998 | Choo et al. | |
| 6,361,652 B2 | 3/2002 | Keiser et al. | |
| 6,361,653 B2 | 3/2002 | Keiser et al. | |
| 6,372,089 B1 * | 4/2002 | Keiser | C01B 33/143 162/168.3 |
| 6,372,805 B1 | 4/2002 | Keiser et al. | |
| 6,372,806 B1 | 4/2002 | Keiser et al. | |
| 6,486,216 B1 * | 11/2002 | Keiser | C01B 33/143 106/482 |
| 6,569,908 B2 | 5/2003 | Noguchi et al. | |
| 6,632,489 B1 | 10/2003 | Watanabe et al. | |
| 6,872,685 B2 | 3/2005 | Timken | |
| 7,919,535 B2 | 4/2011 | Persson et al. | |
| 8,003,707 B2 | 8/2011 | Holland | |
| 8,226,924 B2 | 7/2012 | Morinaga et al. | |
| 8,568,565 B2 | 10/2013 | Tokarz et al. | |
| 8,846,772 B2 | 9/2014 | Lindahl et al. | |
| 2001/0023752 A1 | 9/2001 | Keiser et al. | |
| 2001/0030032 A1 | 10/2001 | Keiser et al. | |
| 2003/0065041 A1 | 4/2003 | Keiser et al. | |
| 2003/0139517 A1 | 7/2003 | Nyander et al. | |
| 2004/0092390 A1 | 5/2004 | Timken | |
| 2005/0004236 A1 | 1/2005 | Workman et al. | |

(Continued)

FOREIGN PATENT DOCUMENTS

| | | |
|---|---|---|
| EP | 0464289 | 1/1992 |
| EP | 0464289 A2 | 1/1992 |

(Continued)

OTHER PUBLICATIONS

Potapov Vadim V et al.,Silica Sols Production by Membrane Concentration of Hydrothermal Solutions,Stanford Geothermal Workshop, 2010.
Potapov Vadim V. et al.,Research on the Use of Silica Extracted from the Hydrothermal Solutions, Stanford Geothermal Workshop, 2012.
International Search Report dated May 27, 2014 for related PCT application PCT/US2014/015456. (10 Pages).
WWW, "www.http://enclycopedia.che.engin.umich.edu/Pages/SeparationsMechanical/SeparationsMechanical.htlm", http://enclycopedia.che.engin.umich.edu/Pages/SeparationsMechanical/SeparationsMechanical.htlm as accessed on Oct. 17, 2013, Oct. 17, 2013.

(Continued)

Primary Examiner — Bobby Ramdhanie
Assistant Examiner — Donovan C Bui-Huynh
(74) Attorney, Agent, or Firm — Eric D. Babych; Brinks Gilson & Lione

(57) ABSTRACT

The invention provides a method for improving the effectiveness of colloidal silica. The method involves removing enough charged impurities from the colloid to prevent the charged particles from causing the colloid to become a viscous gel. The method however also involves not removing too many charged particles so the silica material doesn't gel by cross-linking with itself. This method is quite effective because it recognizes that materials that have accumulated during the formation of the colloid do perform an important function, but they can perform better at a lower concentration.

10 Claims, No Drawings

(56) References Cited

U.S. PATENT DOCUMENTS

| | | | |
|---|---|---|---|
| 2005/0113462 A1* | 5/2005 | Persson | C01B 33/141 516/82 |
| 2005/0178070 A1 | 8/2005 | Workman et al. | |
| 2005/0234136 A1 | 10/2005 | Holland et al. | |
| 2007/0231249 A1 | 10/2007 | Batllo et al. | |
| 2008/0108497 A1 | 5/2008 | Holland | |
| 2010/0040536 A1* | 2/2010 | Morinaga | C01F 7/02 423/625 |
| 2010/0068519 A1 | 3/2010 | Holland et al. | |
| 2010/0104500 A1 | 4/2010 | Holland | |
| 2010/0170419 A1* | 7/2010 | Persson | C01B 33/1435 106/483 |
| 2011/0247774 A1 | 10/2011 | Tokarz et al. | |
| 2011/0250341 A1 | 10/2011 | Keiser et al. | |
| 2012/0128958 A1* | 5/2012 | Zeng | C01B 33/1585 428/219 |

FOREIGN PATENT DOCUMENTS

| | | |
|---|---|---|
| GB | 1587236 | 4/1981 |
| JP | 40-22467 | 1/1992 |
| JP | 11319439 A | 11/1999 |
| JP | 2004-203729 | 7/2004 |
| WO | WO 91/07350 | 5/1991 |
| WO | WO 00/37359 | 6/2000 |
| WO | 2000066491 A1 | 11/2000 |
| WO | WO 2000/66492 | 11/2000 |
| WO | 2000075074 A1 | 12/2000 |
| WO | WO 02/44301 A2 | 6/2002 |
| WO | WO 2005/104683 A2 | 11/2005 |
| WO | WO 2008/058240 A2 | 5/2008 |
| WO | WO 2008/158230 A1 | 12/2008 |

OTHER PUBLICATIONS

Kim, et al., "Comparison of the Properties of Silica Fine Particles Prepared by Using Batch and Semibatch Process", Journal of the Korean Institute of Chemical Engineers, Oct. 25, 1999, pp. 398-404 and abrstract pp. 400-403.

Koros, et al., "Terminology fo Membranes and Membrane Processes", Journal of Membrane Science, vol. 120, 1996. pp. 149-159.

Potapov, et al., "Research on the Use of Silica Extracted from the Hydrothermal Solutions", Potapov Vadim V. et al.,Research on the Use of Silica Extracted from the Hydrothermal Solutions, Stanford Geothermal Workshop, 2012, 2012.

Potapov, et al., "Silica Sols Production by Membrane Concentration of Hydrothermal Solutions", Potapov Vadim V et al.,Silica Sols Production by Membrane Concentration of Hydrothermal Solutions, Stanford Geothermal Workshop, 2010, 2010.

European Extended Search Report from corresponding EP App. No. 14761019.0, dated Sep. 2, 2016, 12 pages.

Iler, Ralph K. "The Chemistry of Silica." Hoboken, NJ: John Wiley & Sons, Inc., 1979, pp. 407-411.

Iler, R.K., "Multilayers of Colloidal Particles." Journal of Colloid and Interface Science (1966), vol. 21, pp. 569-594.

Koros, W.J., Y.H Ma, and T. Shimidzu, "Terminology for Membranes and Membrane Process," Journal of Membrane Science (1996), vol. 120, pp. 149-159.

Lewis, Richard J., Sr. "Hawley's Condensed Chemical Dictionary." 2002, 14$^{th}$ Edition, John Wiley & Sons, Online @ http://knovel.com/web/portal/browse/display? EXT Knovel Display bookid=704 &VerticalID=0, headwords = colloid chemistry; silicic acid; silica gel; sol; solution, colloidal; solution, true; (Knovel Release Date: Sep. 4, 2003; downloaded on Jun. 18, 2011, 3 pages.

Maciel, Gary E. and I-Ssuer Chuang, "Multinuclear NMR Studies of Silica Surfaces," Colloidal Silica, vol. 131. Boca Raton, FL: Taylor & Francis Group, LLC, 2006, pp. 425, 450-451.

Mel. "Separations: Mechanical," Encyclopedia of Chemical Engineering Equipment, downloaded from http://encyclopedia.che.engin.umich.edu/Pages/SeparationsMechanical/SeparationsMechanical.html , on Aug. 15, 2016, 2 pages.

Potapov, V.V., V.A. Gorbach, V.N. Kashpura, I.A. Kashutina, and A.O. Sadovnikova, "Silica Sols Production by Membrane Concentration of Hydrothermal Solutions," Thirty-Fourth Workshop on Geothermal Reservoir Engineering, Stanford University, Stanford, CA, Feb. 1-3, 2010, 7 pages.

Potapov V.V., V.A. Gorbach, A.N. Kashutin, K.S. Shalaev, S.V. Zubaha, and E.V. Shunina, "Research on the Use of Silica Extracted from the Hydrothermal Solutions," Thirty-Seventh Workshop on Geothermal Reservoir Engineering, Stanford University, Stanford, CA, Jan. 30-Feb. 1, 2012, 8 pages.

Roberts, William O., "Manufacturing and Applications of Water-Borne Colloidal Silica," Colloidal Silica, vol. 131. Boca Raton, FL: Taylor & Francis Group, LLC, 2006, pp. 131, 146-148.

Extended European Search Report for EP Application No. 14864844.7, dated Apr. 6, 2017, 8 pages.

* cited by examiner

PROCESS FOR PRODUCING HIGH SOLIDS COLLOIDAL SILICA

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to compositions of matter, methods, and apparatuses useful in producing stable high solids colloidal silica and uses thereof. As described in U.S. Pat. Nos. 6,486,216, 6,361,653, 5,840,158, 6,361,652, 6,372,805, and US Published Patent Application 2011/0250341 A1, Colloidal silicas, are aqueous systems with silica microparticles suspended within them. Colloidal silicas have been found to be useful in numerous fields of application dependent on the particle size including the manufacture of silicon wafers and carbonless papers, as anti-soilants, lubricants, high temperature binders, abrasives, moisture absorbers, and abrasion resisters. In particular as described for example in U.S. Pat. Nos. 4,753,710, 4,913,775, 4,388,150, 4,385,961, 5,182,062, and 5,098,520, colloidal silicas have been found to have an especially useful number of applications in the papermaking industry, especially in enhancing the retention and drainage of paper pulps.

The nature of colloidal silicas unfortunately subjects them to a number of limiting constraints. When dosing a colloidal silica two factors are of large significance, average particle size (usually measured in surface area) and the percentage of the aqueous system that the particles comprise (solids %). For a given application there is an ideal particle size at which the colloidal silica will be most effective. Often a user would prefer to apply as high a solids % at that particle size as possible. However applying that ideal particle size is often impractical because the colloidal silica is not stable at that size at a high solids % for a sufficient length of time.

Stability of colloidal silicas is very important. If the colloids are not stable they can only be used during a very narrow window of time. This narrowness forces numerous costs and inconveniences on users in terms of among other things: storage costs, preparation costs, equipment requirements, and the need to constantly replace no longer stable colloids. The stability of colloidal silica is inversely proportional to both solids % and to particle size. As a result a silica colloid of a given particle size will only be stable for a significant period of time (for example >3-6 months) up to a particular solids % which is usually lower than the ideal amount. When a colloid's solids % exceeds that level, the silanol groups on various microparticles interact with each other and form interlocked complexes which cause the aqueous system to become a highly viscous sludge which is no longer effective for its intended use. In addition, other factors can impair the stability of the microparticles. As a result users are often forced to choose between more stable colloidal silicas that have a lower solids % than they want or they must use colloidal silicas having a desired solids % but which are less stable than desirable.

Thus there is a clear need for and utility in an improved method of producing stable high solids colloidal silica. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. § 1.56(a) exists.

BRIEF SUMMARY OF THE INVENTION

At least one embodiment of the invention is directed towards a method for improving the performance of colloidal silica. The method comprises the steps of: providing a colloidal silica, and separating charged particles from the colloid. The separation is conducted to a degree such that cross-linkage inducing interactions between charged particles and silanol groups on the silica decreases but not to such a degree that cross-linkage inducing interactions between silanol groups increases. The separation increases the particle size of the colloid by at least 5% without impairing the S-Value, or stability of the colloid.

The colloid may be applied to a papermaking system and it may be at least as effective in its application as a similar colloid that has not undergone the separation. The separated particles may be particles that were introduced to the colloid during a heel or resin based formation process. The colloidal particles may have has a surface area of from about 700 m$^2$/g to about 1100 m$^2$/g, and may have a percent by weight SiO$_2$ solids level of at least 15. The separation may be accomplished using a dilution filtration process in which the filtration is at least in part ultrafiltration. The dilution may occur at a different time than the filtration and/or may overlap at least in part. The rate of the dilution may be such that fluid passes through a filter in the filtration process at a net rate no faster than the rate the net rate that the charged particles dissociate from colloidal droplets. The method may comprise repeatedly diluting then filtering the colloid, the diluting characterized by decreasing the solids % by between 30 to 80% of the solids % present at the start of the process, the filtering, except for a final filtration step, comprises returning the solids % to within 10-60% of the solids % present at the start of the process. The dilution may not commence until the rate of the fluid passing through the filter slows. The colloid may be applied to a papermaking process as part of a retention and drainage program and/or may be used in conjunction with polymeric flocculants and/or cationic starch with or without the addition of a coagulant and there is no loss of effectiveness or unwanted side effects when compared to a similar colloid that has not undergone the separation. The degree to which impurities have been removed from the colloid may be measured by correlating it to a measurement of the change in the conductivity of the colloid. The removal of impurities may proceed until the colloidal system has a conductivity of between 4000 μS/cm to 7000 μS/cm.

Additional features and advantages are described herein, and will be apparent from, the following Detailed Description.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category "Colloid" or "Colloidal System" means a substance containing ultra-small particles substantially evenly dispersed throughout another substance, the colloid consists of two separate phases: a dispersed phase (or internal phase) and a continuous phase (or dispersion medium) within which the dispersed phase particles are dispersed, the dispersed phase particles may be solid, liquid, or gas, the dispersed-phase particles have a diameter of between approximately 1 and 1,000,000 nanometers, the dispersed-phase particles or droplets are affected largely by the surface chemistry present in the colloid.

"Colloidal Silica" means a colloid in which the primary dispersed-phase particles comprise silicon containing molecules, this definition includes the full teachings of the reference book: *The Chemistry of Silica: Solubility, Polymerization, Colloid and Surface Properties and Biochemistry of Silica*, by Ralph K. Iler, John Wiley and Sons, Inc., (1979) generally and also in particular pages 312-599, in general when the particles have a diameter of above 100 nm they are referred to as sols, aquasols, or nanoparticles.

"Colloidal Stability" means the tendency of the components of the colloid to remain in colloidal state and to not either cross-link, divide into gravitationally separate phases, and/or otherwise fail to maintain a colloidal state its exact metes and bounds and protocols for measuring it are elucidated in *The Chemistry of Silica: Solubility, Polymerization, Colloid and Surface Properties and Biochemistry of Silica*, by Ralph K. Iler, John Wiley and Sons, Inc., (1979).

"Microparticle" means a dispersed-phase particle of a colloidal system, generally microparticle refers to particles that have a diameter of between 1 nm and 100 nm which are too small to see by the naked eye because they are smaller than the wavelength of visible light.

"S-Value" means the measure of the degree of microaggregation of colloidal materials, it can be obtained from measurements of viscosity of the colloidal system and is often related to the performance of the colloidal end product, its exact metes and bounds and protocols for measuring it are elucidated in *The Chemistry of Silica: Solubility, Polymerization, Colloid and Surface Properties and Biochemistry of Silica*, by Ralph K. Iler, John Wiley and Sons, Inc., (1979).

"Solids %" means the portion of an aqueous system by weight that is silica bearing particles of the continuous phase.

"Silanol" means a functional group on a silicon bearing molecule with the connectivity of Si—O—H.

"Separation" means a mass transfer process that converts a mixture of substances into two or more distinct product mixtures, at least one of which is enriched in one or more of the mixture's constituents, it includes but is not limited to such processes as: Adsorption, Centrifugation, cyclonic separation, density based separation, Chromatography, Crystallization, Decantation, Distillation, Drying, Electrophoresis, Elutriation, Evaporation, Extraction, Leaching extraction, Liquid-liquid extraction, Solid phase extraction, Flotation, Dissolved air flotation, Froth flotation, Flocculation, Filtration, Mesh filtration, membrane filtration, microfiltration, ultrafiltration, nanofiltration, reverse osmosis, Fractional distillation, Fractional freezing, Magnetic separation, Precipitation, Recrystallization, Sedimentation, Gravity separation, Sieving, Stripping, Sublimation, Vapor-liquid separation, Winnowing, Zone refining, and any combination thereof.

"Ultrafiltration" means a process of filtration in which hydrostatic pressure forces a filtrate liquid against a semipermeable membrane, suspended solids and solutes of high molecular weight are retained, while water and low molecular weight solutes pass through the membrane, it is used in industry and research for purifying and concentrating macromolecular ($10^3$-$10^6$ Da) solutions, it includes but is not limited to microfiltration, nanofiltration or gas separation, it may be applied in cross-flow or dead-end mode and separation in ultrafiltration may undergo concentration polarization the exact metes and bounds and protocols for applying and categorizing ultrafiltration are elucidated in the scientific reference: *Ultrafiltration and Microfiltration Handbook, Second Edition*, by Munir Cheryan, Published by CRC Press LLC, (1998).

"Droplet" means a mass of dispersed phase matter surrounded by continuous phase liquid, it may be suspended solid or a dispersed liquid.

"Particle Size" means the surface area of a single droplet.

"Dilution Filtration" means a process in which a material undergoing a filtration process is also being diluted by the addition of liquid to the material, dilution filtration can be simultaneous (the filtration and dilution occur at the same time) staged (the dilution and filtration processes occur one after the other, and/or both and can have one or more relative rates (liquid can be removed from the material by the filtration process faster, slower and/or at the same rate as liquid is added by the dilution process).

"Interface" means the surface forming a boundary between two or more phases of a liquid system.

"Papermaking process" means any portion of a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. The papermaking process may also include a pulping stage, i.e. making pulp from a lignocellulosic raw material and bleaching stage, i.e. chemical treatment of the pulp for brightness improvement.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

At least one embodiment of the invention is a stable silica colloid whose dispersed phase microparticle has a surface area of from about 700 $m^2/g$ to about 1100 $m^2/g$, and having a percent by weight $SiO_2$ solids level of from about 10 percent to 30 percent preferably 15 percent to about 25 percent. The dispersed phase microparticle differs from prior art microparticles by undergoing a separation process which improves its stability.

Colloidal silica contains a number of compositions of matter other than silica bearing molecules, the carrier fluid of the continuous phase, and additives such as emulsifiers or flocculants that aid in the maintenance of the colloid. These particles include salt ions, acids, and bases, which were used to create the silica bearing compounds and/or to condition them to remain in a colloidal state. Once colloidal, however, many of these vestiges are impurities that are no longer required and, to an extent, impair the stability of the colloid. As a result, at least partial removal of the impurities helps to reduce reactivity between the impurities and the silanol groups on the silica bearing compounds.

In at least one embodiment the separation process is only a partial removal of impurities. While some impurities have a tendency to react with or facilitate reaction with the silanol groups they also tend to mediate and impair silanol-silanol reactions on adjacent silica-bearing compounds. As a result, a fine equilibrium is achieved by removing some but not all of the impurities from the colloidal system.

The separation may be achieved by any form of separation known in the art. In at least one embodiment the separation method is an ultrafiltration method conducted during filtration-dilution conditions. Many of the impurities are so fine in size that they can only be removed utilizing ultrafiltration techniques. Unfortunately, as can be seen in the provided Examples, applying an ultrafiltration process to the colloid results in a less stable colloid. This is because the charge balancing environment results in their disassociating and flowing into the filtration membrane slower than the carrier fluid of the continuous phase does. As a result additional fluid must be added to the continuous phase to facilitate the removal.

In at least one embodiment the distinct filtration and dilution applications applied to the colloid are conducted: simultaneously, sequential, and/or are performed with differing rates of filtration and dilution. In at least one embodiment a stable colloid having a starting solids % is diluted so the solids % decreases by between 30 to 80%. Then the colloid is concentrated/filtered until the solids percent returns to within 10% of the starting solids %. Then it is again diluted to decrease by between 30 to 80%. And finally it is filtered again to achieve a weight % which is between 30 to 80% greater than the starting solids % and which is less likely to gel than it was at the starting solids % and it is no less stable. In at least one embodiment the microparticle surface area is greater than 700 $m^2/g$.

In at least one embodiment the degree of removal of charged impurities present in the colloid can be accomplished by measuring the conductivity of the colloid both before and after any filtration or concentration step is performed. As many of the impurities are ionic, removal of impurities should correspond with lower conductivity. In at least one embodiment removal impurities proceed until the colloidal system has a conductivity of between 4000 μS/cm to 7000 μS/cm.

In at least one embodiment at least one of the impurities removed are one or more items that entered the colloid during a heel based formation process. These impurity items include but are not limited to alkali metal salts such as potassium or sodium based salts and acids or acid residues and acid derivatives. In a heel based process an initial composition, known as a "heel" is formed into which is added a source of active silica, usually in the form of silicic acid or polysilicic acid, over a specified time. The heel may be composed of water, any of a number of commercially available silicates or alkali water glasses, and an acid and/or a corresponding salt thereof in a prescribed ratio. A detailed example of a heel based formation process is:

(a) forming a heel, with said heel containing water, an alkali metal silicate wherein the molar ratio of $SiO_2$ to $Na_2O$ or $K_2O$ is greater than about 1:1 and is less than about 15:1; an acid (and/or a corresponding salt thereof), wherein said heel has a pH of at least 10, wherein the alkali metal silicate and acid are initially present in a ratio by weight of at least 63:1, wherein the temperature of the heel is below 100 degrees F.;

(b) adding to the initial composition an aqueous silicic acid composition typically having a $SiO_2$ content in the range of from about 5.0 to about 7.2 percent by weight, while maintaining the temperature of the composition below 100 degrees F., wherein the aqueous silicic acid composition is added slowly and continuously until from about one half to about three-quarters of the silicic acid composition has been added to the initial composition;

(c) increasing the temperature of the composition from below 100 degrees F. to between about 115 degrees F. and about 125 degrees F. in a time period of from about 10 to about 35 minutes, and maintaining the temperature until the addition of all the silicic acid composition is complete;

(d) optionally, maintaining the temperature of the composition below 125 degrees F. for about an hour; and (e) discontinuing the heating and (f) optionally removing water from the resulting composition until the solids content based on $SiO_2$ of the resulting aquasol is at least about 7.00 percent by weight.

Acids which may used in a heel based process can be any number of organic or mineral acids. Examples of such acids include, but are not limited to: mineral acids such as hydrochloric, phosphoric or sulfuric or such materials as carbon dioxide. Organic acids include but are not limited to: acetic acid, formic acid and propionic acid. Examples of suitable salts include: sodium sulfate, sodium acetate, potassium sulfate, potassium acetate, trisodium phosphate and sodium monohydrogen phosphate.

Once the heel is prepared, the temperature of the composition is reduced to 85 degrees F., or lower, typically to 80 degrees F., or lower, and usually in a range of from 60 to 85 degrees F. At this point, silicic acid or poly silicic acid is slowly added to the composition, for example over a total period of about 4 hours. Silicic acid suitable for the present invention can be prepared via known methods in the art, such as the cation exchange of dilute solutions of alkali water glasses. Typically, the dilute solutions contain from 3.0 to 9.0 percent by weight solids based on SiO2, typically from 5.0 to 7.2 percent by weight, and preferably from 6.0 to 6.8 percent by weight. Representative commercial preparations are outlined in U.S. Pat. Nos. 3,582,502 and 2,244,335. While the ratio by weight of the alkali metal silicate to acid can vary, typically the ratio is at least 63:1. The silicic acid or poly silicic acid is slowly and continuously added to the composition with stirring, until from about one-half to about three-quarters of the silicic acid or poly silicic acid has been added to the composition while maintaining the temperature of the composition below 85 degrees F., typically from about 60-85 degrees F. Thereafter, the temperature of the composition is slowly raised, for example over a period of from 10 to 35 minutes, to from 115-125 degrees F., and held in this temperature range until the addition of the remainder of the silicic acid or poly silicic acid to the composition is complete.

As described in U.S. Pat. No. 6,486,216 a heel based colloidal silica can be concentrated and remain stable until the final colloidal product contains from about 7.00 percent to about 16.8 percent by weight $SiO_2$. If however the various compositions that were acquired during the heel process are removed in an amount such that the impurity-silonol reactivity decreases while the silanol-silanol reactivity does not increase, colloids with a higher weight % can be prepared.

In at least one embodiment at least one of the impurities removed are one or more items that entered the colloid during a resin based formation process. These impurity items include but are not limited to cationic resin exchange material, weak acids, and alkali metal based salts. In a resin based formation process a cationic ion exchange resin, preferably a weak acid cationic ion exchange resin, is used to initiate the reaction of an alkali metal silicate to produce the colloidal silica. The reaction is controlled by the rate of addition and the ratio of alkali metal silicate to ion exchange resin during the polymerization to produce the colloidal silica. Heat treatment of the colloidal silica product is optional.

A detailed example of a resin based formation process includes the steps of:

(a) charging a reaction vessel with a cationic ion exchange resin having at least 40 percent of its ion exchange capacity in the hydrogen form wherein the reaction vessel has means for separating the colloidal silica formed during the process from the ion exchange resin;

(b) charging the reaction vessel with an aqueous alkali metal silicate having a mole ratio of $SiO_2$ to alkali metal oxide in the range of from about 1:1 to about 15:1 and a pH of at least 10.0, (c) stirring the contents of the reaction vessel until the pH of the contents of the vessel is in the range of from about 8.5 to about 11.0;

(d) adjusting the pH of the contents of the reaction vessel to above about 10.0, using an additional amount of the alkali metal silicate; and (e) separating the resulting colloidal silica of the invention from the ion exchange resin while removing the colloidal silica from the reaction vessel.

A reaction may be controlled by the rate of addition (for example, from 0 to 30 minutes, typically less than 15 minutes) and the ratio of alkali metal silicate to ion exchange resin during the polymerization to produce the colloidal silica. The molar ratio of hydrogen ion in the cationic ion exchange resin to alkali metal ion in the alkali metal silicate ranges from 40 to 100 percent, preferably from 50 to 100 percent. The temperature during colloidal silica formation in this alternative embodiment of the invention generally ranges from 50 degrees F. to 100 degrees F., preferably from 70 degrees F. to 90 degrees F. Heat treatment of the colloidal silica product (i.e., post treatment) is optional in this embodiment of the process of the invention. The adjustment of pH in step (d) can be carried out either in the reaction vessel or after the resulting colloidal silica has been removed from the reaction vessel. This adjustment of pH typically is carried out within 10 minutes to 3 hours from when step (e) has been completed.

In at least one embodiment the separation step results in a solids % content of the colloid which is increases by up to 25% without any corresponding loss or impairment in stability, S-Value, and/or particle surface area. In at least one embodiment the increased solids colloid is used in a papermaking process without any loss in effectiveness. For example the increased solids colloid can be used in conjunction with polymeric flocculants and/or cationic starch with or without the addition of a coagulant as part of a retention and drainage program without any loss of effectiveness or unwanted side effect.

Examples

The foregoing may be better understood by reference to the following Examples, which are presented for purposes of illustration and are not intended to limit the scope of the invention:

A number of colloidal silica samples were produced according to a resin based formation process. Various properties of the samples were measured, S-Value, surface area, and solids % are proxys for predicting the sample's effectiveness in industrial applications. The samples were derived from commercially available colloidal silicas (POSITEK 8699 by Nalco Company, Naperville, Ill.) and were modified according to one of the following treatment protocols:
I) No modification
II) Cationic Resin added to reduce conductivity
III) Ultra-filtration applied
IV) Di-filtration applied Properties of these samples are listed below.

TABLE I

| Sample Number (Indicates Treatment Type) | Solids % | Surface Area ($m^2/g$) | S-Value (%) | pH |
|---|---|---|---|---|
| 1-I | 14.36 | 739.3 | 39.1 | 11.04 |
| 2-I | 19.70 | 728.1 | 38.9 | 10.97 |
| 3-II | 19.54 | 721.1 | 40.1 | 10.80 |
| 4-I | 14.46 | 727.4 | 36.5 | 11.03 |
| 5-I | 19.76 | 712.4 | 36.5 | 11.02 |
| 6-I | 10.77 | 761.1 | 33.5 | 19.97 |
| 7-II | 14.58 | 747.5 | 34.5 | 10.99 |
| 8-IV | 19.76 | 716.3 | 34.4 | 11.02 |
| 9-III | 19.75 | 732.5 | 33.5 | 10.98 |
| 10-I | 19.75 | 716.3 | 33.5 | 10.98 |

The stabilities of these colloids were as follows:

TABLE 2

| Elapsed Time (Weeks) | Sample 2-I Viscosity (cps) | Sample 3-II Viscosity (cps) | Sample 4-I Viscosity (cps) | Sample 10-I Viscosity (cps) | Sample 9-III Viscosity (cps) | Sample 8-IV Viscosity (cps) |
|---|---|---|---|---|---|---|
| 0 | 9.5 | 9.5 | 12.4 | 26.9 | 33.2 | 19.7 |
| 1 | 17.3 | 11.9 | 19.3 | 256.0 | 47.2 | 21.7 |
| 2 | 135.0 | 17.6 | 29.1 | >4000 | 80.3 | 26.7 |
| 3 | >4000 | 31.6 | 69.5 | Gel | 289.0 | 36.6 |
| 4 | >4000 | 72.6 | 301.5 | Gel | >2000 | 81.4 |

The data shows that initial charge variability in colloids will lead to differing initial values and stability of colloid. It also shows that using a cationic resin may negate some of the charge based colloidal stability issues but does so at the expense of desirable properties in the colloid. Sample 8-IV however shows that when properly using difilitration, equilibrium can be reached in which the charge based effects on stability can be achieved without sacrificing desirable colloidal properties.

A number of other colloids were produced using the inventive method which illustrates the stability (via viscosity) of the colloids. These samples demonstrate that some removal of impurities does not significantly decrease colloidal stability by not significantly increasing the viscosity but that too much removal causes the viscosity to significantly increase because of greater silanol-silanol interactions.

Equipment used to prepare the high solids colloidal silica is comprised of a 60 gallon jacketed stainless steel reactor vessel, PCI ultrafiltration unit with PVDF membranes. Charge 254 lb. of a standard commercial silica, Nalco 8699, into the 60 gallon reactor, followed by 254 lb. of soft water (~260 µS/cm conductivity). Mix reactor contents, heat the diluted solution to 100° F., then open the ultrafiltration loop valve, allowing the solution to recirculate through the ultrafiltration unit. Maintain pump outlet pressure at 100-110 psi throughout the entire process. As the silica solution concentrates, measure the flow rate, mass, and conductivity of ultrafiltration unit permeate to estimate silica solids.

Stop ultrafiltration when solution actives reach ~15.0%. Charge an additional 128 lb. of soft water into the reactor, lowering silica concentration to ~10.0%. Mix reactor contents, heat to 100° F., then recirculate through the ultrafiltration unit the same as in the previous paragraph, with the goal of concentrating the silica solution to ~21.0% actives. Maintain pump outlet pressure at 100-110 psi. Collect silica solution aliquots at select times during the entire diafiltration process. Characterize samples in terms of pH, conductivity, specific gravity, Brookfield viscosity, and percent solids.

TABLE 3

| Microparticle | Solids % | Specific Gravity | Specific Gravity % Solids | pH | Brookfield Viscosity (#1 @ 60) |
|---|---|---|---|---|---|
| 1-I | 14.49 | 1.0979 | 14.67 | 10.79 | 5.4 |
| Initial Dilution | 7.30 | 1.0474 | 7.74 | n/a | n/a |
| A | 14.66 | 1.0980 | 14.69 | 10.67 | 5.5 |
| B | 9.63 | 1.0626 | 9.82 | 10.63 | 3.3 |
| C | 14.64 | 1.0976 | 14.63 | 10.59 | 5.6 |
| D | 16.78 | 1.1134 | 16.80 | 10.57 | 7.9 |
| E | 18.04 | 1.1229 | 18.10 | 10.56 | 10.0 |
| F | 19.17 | 1.1316 | 19.30 | 10.54 | 12.4 |
| G | 20.12 | 1.1387 | 20.27 | 10.54 | 15.6 |
| H | 21.18 | 1.1467 | 21.37 | 10.53 | 20.8 |

The same procedure was then performed for diafiltration with no changes in the first dilution-concentration step. Charge 253 lb. of soft water into the reactor for the second dilution, instead of 128 lb. in example 1, and stop ultrafiltration when solution actives reach ~15.0%. Charge an additional 138 lb. of soft water into the reactor for a third dilution, lowering silica concentration to ~10.0%. Mix reactor contents, heat to 100° F., then recirculate through the ultrafiltration unit, with the goal of concentrating the silica solution to ~21.0% actives. Maintain pump outlet pressure at 100-110 psi.

Collect silica solution aliquots at select times during the entire diafiltration process. Characterize samples in terms of pH, conductivity, specific gravity, Brookfield viscosity, and percent solids.

TABLE 4

| Microparticle | Solids % | Specific Gravity | Specific Gravity % Solids | pH | Brookfield Viscosity (#1 @ 60) |
|---|---|---|---|---|---|
| 1-I | 14.49 | 1.0979 | 14.67 | 10.79 | 5.4 |
| Initial Dilution | 7.19 | 1.0463 | 7.59 | n/a | n/a |
| A | 14.49 | 1.0964 | 14.47 | 10.74 | 5.3 |
| B | 7.05 | 1.0453 | 7.45 | 10.66 | 2.9 |
| C | 14.63 | 1.0968 | 14.52 | 10.59 | 5.8 |
| D | 9.71 | 1.0633 | 9.92 | 10.56 | 3.6 |
| E | 15.21 | 1.1006 | 15.04 | 10.50 | 6.7 |
| F | 17.61 | 1.1183 | 17.47 | 10.46 | 10.0 |
| G | 19.55 | 1.1334 | 19.55 | 10.44 | 14.8 |
| H | 20.23 | 1.1386 | 20.26 | 10.43 | 17.5 |
| I | 21.16 | 1.1456 | 21.22 | 10.41 | 22.5 |

The same procedure was performed for diafiltration with no changes in the two dilution-concentration steps, except the substitution of deionized water (<1 μS/cm) for soft water.

TABLE 5

| Microparticle | Solids % | Specific Gravity | Specific Gravity % Solids | pH | Brookfield Viscosity (#1 @ 60) |
|---|---|---|---|---|---|
| 1-I | 14.49 | 1.0979 | 14.67 | 10.79 | 5.4 |
| Initial Dilution | 7.32 | 1.0470 | 7.68 | n/a | n/a |
| A | 14.60 | 1.0976 | 14.63 | 10.84 | 5.6 |
| B | 9.65 | 1.0625 | 9.81 | 10.81 | 3.6 |
| C | 14.65 | 1.0975 | 14.62 | 10.74 | 6.0 |
| D | 16.88 | 1.1138 | 16.85 | 10.72 | 8.3 |
| E | 18.16 | 1.1233 | 18.16 | 10.71 | 10.7 |
| F | 19.22 | 1.1313 | 19.26 | 10.70 | 12.9 |
| G | 20.20 | 1.1388 | 20.29 | 10.69 | 16.2 |
| H | 21.14 | 1.1459 | 21.26 | 10.68 | 20.7 |

While this invention may be embodied in many different forms, there are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

Any ranges given either in absolute terms or in approximate terms are intended to encompass both, and any definitions used herein are intended to be clarifying and not limiting. All ranges and parameters disclosed herein are understood to encompass any and all subranges (including all fractional and whole values) subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), end ending with a maximum value of 10 or less, (e.g. 2.3 to 9.4, 3 to 8, 4 to 7), and finally to each number 1, 2, 3, 4, 5, 6, 7, 8, 9, and 10 contained within the range. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of preparing stable colloidal silica, the method comprising:
   a) filtering a colloidal silica solution using an ultrafiltration unit to concentrate the colloidal silica solution, wherein the colloidal silica comprises dispersed-phase particles;
   b) separating impurity particles from the colloidal silica solution using the ultrafiltration unit;
   c) diluting the colloidal silica solution by decreasing the solids weight % by between 30 to 80%; and
   d) filtering the colloidal silica solution until the solids weight % is at least 15%,
   wherein the separating increases a particle size of the colloidal silica by at least 5%, and wherein step d) is performed after steps a), b), and c),
   wherein the colloidal silica solution has an S-value ranging from 34.4% to 40.1% and a conductivity between 4000 µS/cm to 7000 µS/cm, and the dispersed-phase particles of the colloidal silica solution have a surface area of from about 700 $m^2$/g to about 1100 $m^2$/g.

2. The method of claim 1, wherein the impurity particles are introduced to the colloidal silica solution during a heel or resin based formation process.

3. The method of claim 1, wherein the diluting step occurs at a different time than the filtering steps.

4. The method of claim 1, wherein the diluting and the filtering step overlap at least in part.

5. The method of claim 1, wherein fluid passes through a filter at a first rate and subsequently at a second rate, the second rate being slower than the first rate, and the diluting step does not commence until the fluid passing through the filter slows to the second rate.

6. The method of claim 1, wherein impurity separation is measured by measuring a change in conductivity of the colloid.

7. The method of claim 1, wherein the impurity particles comprise charged particles.

8. A method for preparing stable colloidal silica, the method comprising:
   performing a dilution-filtration process to partially separate impurity particles from a colloidal silica, wherein the colloidal silica comprises dispersed phase particles, wherein the dilution-filtration process comprises diluting and filtering the colloidal silica solution simultaneously, and
   separating the impurity particles so that a diameter of the dispersed phase particles has increased by at least 5%,
   wherein the colloidal silica has an S-value ranging from 34.4% to 40.1% and a conductivity between 4000 µS/cm to 7000 µS/cm, and the dispersed-phase particles of the colloidal silica have a surface area of from about 700 $m^2$/g to about 1100 $m^2$/g.

9. A method of preparing stable colloidal silica, the method comprising:
   repeatedly diluting and filtering an impure colloidal silica to separate impurity particles, wherein the impure colloidal silica comprises dispersed phase particles, wherein each diluting step comprises decreasing a solids percentage by between 30 to 80%, and wherein each filtering step comprises returning the solids percentage to within 10-60% of the solids percentage present before diluting and filtering the impure colloidal silica, with the exception of a final filtration step, to form a more pure colloidal silica,
   wherein the diluting and filtering continues until the final filtration step where the diameter of the dispersed phase particles of the more pure colloidal silica is at least 5% greater than the impure colloidal silica and the more pure colloidal silica comprises more than 16.8% silica,
   wherein the more pure colloidal silica has an S-value ranging from 34.4% to 40.1% and a conductivity between 4000 µS/cm to 7000 µS/cm, and the dispersed-phase particles of the more pure colloidal silica have a surface area of from about 700 $m^2$/g to about 1100 $m^2$/g.

10. The method according to claim 1, wherein the more pure colloidal silica has a pH of about 10.

* * * * *